United States Patent [19]
Fujiwara

[11] Patent Number: 5,479,503
[45] Date of Patent: Dec. 26, 1995

[54] TWO-WIRE TO FOUR-WIRE SWITCHING EXCHANGER

[75] Inventor: Gen'ichi Fujiwara, Hyogo, Japan

[73] Assignee: Mitsubishi Denki Kabushiki Kaisha, Tokyo, Japan

[21] Appl. No.: 91,196

[22] Filed: Jul. 14, 1993

[30] Foreign Application Priority Data

Aug. 24, 1992 [JP] Japan ................... 4-223901

[51] Int. Cl.$^6$ .............................................. H04M 3/26
[52] U.S. Cl. ..................... 379/402; 379/406; 379/410; 379/411; 379/412
[58] Field of Search ........................ 379/402, 410, 379/411, 406, 407, 408, 409

[56] References Cited

U.S. PATENT DOCUMENTS

| | | | |
|---|---|---|---|
| 4,593,161 | 6/1986 | Desblache et al. | 364/724 |
| 4,757,527 | 7/1988 | Beniston et al. | 379/410 |
| 4,811,342 | 3/1989 | Huang | 379/411 |
| 4,862,449 | 8/1989 | Hoefkens et al. | 379/411 |
| 4,870,675 | 9/1989 | Fuller et al. | 379/6 |
| 4,887,288 | 12/1989 | Erving | 379/6 |
| 4,922,530 | 5/1990 | Kenney et al. | 379/411 |
| 5,029,167 | 7/1991 | Arnon et al. | 379/410 |
| 5,034,978 | 7/1991 | Nguyen et al. | 379/403 |
| 5,317,596 | 5/1994 | Ho et al. | 379/411 |

OTHER PUBLICATIONS

"Digital Voice Echo Canceller with a TMS32020", Digital Signal Processing Applications with the TMS320 Family, Theory, Algorithms, and Implementations, Texas Instruments, Inc., 1986.

*Primary Examiner*—Jeff Hofsass
*Assistant Examiner*—Jacques M. Saint-Surin
*Attorney, Agent, or Firm*—Rothwell, Figg, Ernst & Kurz

[57] ABSTRACT

Before starting the communication, a frequency characteristic measuring signal is outputted from a frequency characteristic measuring apparatus 9 to measure the frequency characteristic. Next, a frequency characteristic of a filter is set up based on the frequency characteristic obtained as a result of measuring by means of a digital filter 8. With this configuration, it is designed not to leave an echo signal even if this two-wire to four-wire switching exchanger is connected to any two-wire communication lines.

5 Claims, 2 Drawing Sheets

TWO-WIRE TO FOUR-WIRE SWITCHING EXCHANGER

BACKGROUND OF THE INVENTION

1. Field of the Invention

This invention relates to a circuit configuration method for a two-wire to four-wire switching exchanger which separates transmission/receiving signals of communication equipment connected to two-wire communication line such as main wire or PBX extension into four-wire transmission/receiving signals.

2. Description of the Prior Art

FIG. 2, for example, shows a block diagram illustrating a configuration of a conventional two-wire to four-wire switching exchanger which is described in the "MOTOROLA SEMICONDUCTOR TECHNICAL DATA DSP56200 Advance Information" (MOTOROLA INC., 1988). Referring now to FIG. 2, reference numeral 1 is a hybrid circuit, numeral 2 is a balancing network, numeral 3 a receiving amplifier, numeral 4 a transmission amplifier, numeral 5 A/D converter, numeral 6 D/A converter, numeral 7 a signal adding machine and numeral 8 a digital filter respectively.

Then, the operation of the conventional two-wire to four-wire switching exchanger will be described below. First, a receiving signal from a two-wire communication line is inputted from the hybrid circuit 1 and passes through the receiving amplifier 3, the A/D converter 5 and the signal adding machine 7 to become a four-wire receiving signal.

On the other hand, a four-wire transmission signal passes through the D/A converter 6 and the transmission amplifier 4 and sent out through the hybrid circuit 1 to the two-wire communication line. And at the same time, the transmission signal reaching the hybrid circuit 1 is not always outputted to the two-wire communication line, but a part thereof flows from the hybrid circuit 1 to the receiving amplifier 3 and follows the same route as the receiving signal to appear on the four-wire receiving output as an echo signal. The volume of this echo signal is in proportion to a discrepancy in impedance balance between the two-wire communication line and the balancing network 2.

Then, the four-wire transmission signal is processed to form an inverted signal at a size corresponding to the volume of said echo signal by means of the digital filter 8. When such an inverted signal is added to the signal outputted from the A/D converter 5 by the signal adding machine 7, the signal outputted from the adding machine 7 becomes the four-wire receiving signal leaving the two-wire receiving signal by cancelling only the echo signal.

In such a conventional two-wire to four-wire switching exchanger as constructed above, as far as the actual communication line is concerned, a line length, a line diameter and the combination thereof are different in each case and therefore the impedance of the communication line also differs from each other. As a result, the echo condition is also completely different for each line and problems can arise with the conventional switching exchanger where the echo still remains because it is difficult to cancel the echo in all lines.

SUMMARY OF THE INVENTION

It is therefore an object of the present invention to provide an improved two-wire to four-wire switching exchanger in which an echo signal does not remain even if it is connected to any two-wire communication lines in order to solve the problems described above.

In the two-wire to four-wire switching exchanger according to the present invention, there is provided a signal characteristic measuring apparatus which is adapted to measure an echo signal flowing from a transmission circuit to a receiving circuit, input such measured data to a digital filter, and correct a false echo generating from the digital filter.

The two-wire to four-wire switching exchanger according to the present invention is therefore designed to measure the echo signal by means of the signal characteristic measuring apparatus and correct the false echo generating from the digital filter.

The above and other objects, features and advantages of the invention will become more apparent from the following description when taken in conjunction with the accompanying drawings, in which:

DESCRIPTION OF THE PREFERRED EMBODIMENT

Figure 1:
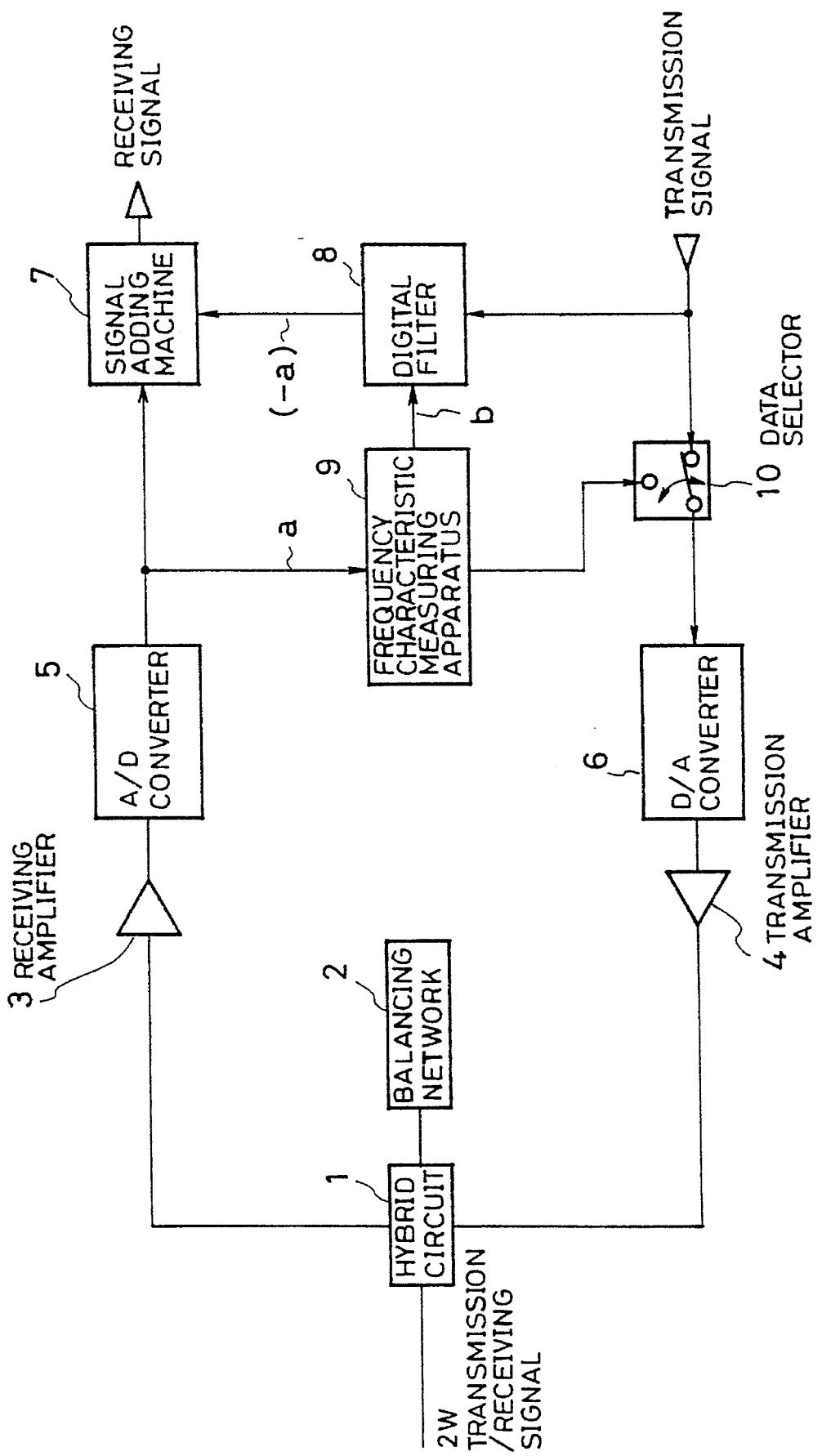
FIG. 1 is a block diagram illustrating a two-wire to four-wire switching exchanger according to an embodiment of the present invention.
Figure 2:
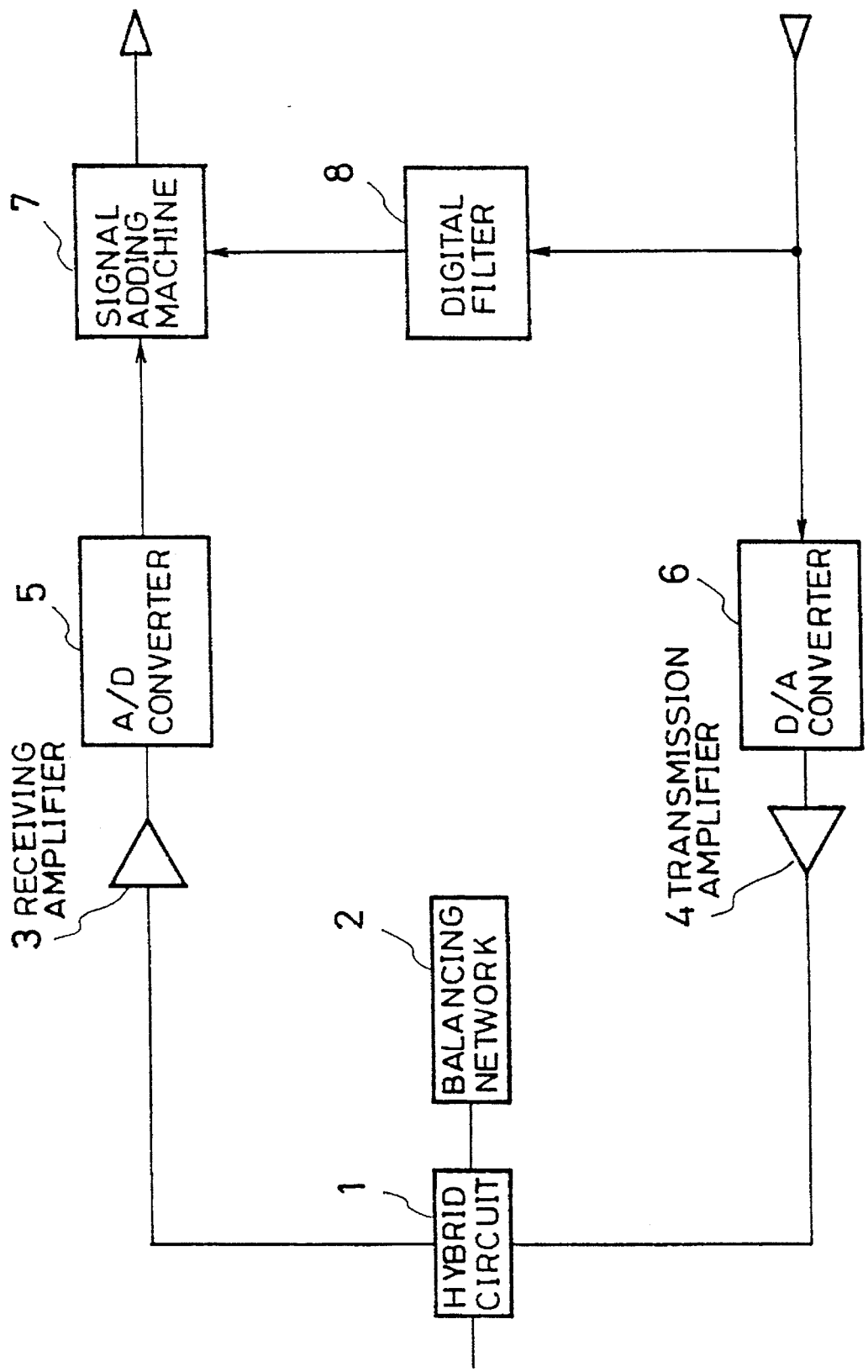
FIG. 2 is a block diagram illustrating a conventional two-wire to four-wire switching exchanger.

An embodiment of the present invention will be described hereinafter with reference to the drawing. In FIG. 1, reference numeral 1 shows a hybrid circuit forming a part of the communication line, numeral 2 shows a balancing network, numeral 3 a receiving amplifier, numeral 4 a transmission amplifier, numeral 5 an A/D converter, numeral 6 a D/A converter, numeral 7 a signal adding machine, numeral 8 a digital filter, numeral 9 a signal characteristic measuring apparatus regarding the frequency composed of a software or a hardware, and numeral 10 a data selector of a switch respectively. The transmission amplifier 4 and the D/A converter 6 form a transmission line, and the receiving amplifier 3, the A/D converter 5 and the signal adding machine 7 form a receiving line respectively.

Next, the operation of the two-wire to four-wire switching exchanger will be described below. First, before starting the communication, the data selector 10 is switched to the side of the frequency characteristic measuring apparatus 9 according to the present embodiment from which a characteristic measuring signal (for example, a single cycle signal is outputted and the frequency is gradually changed within a range of the communication area) is outputted to check the frequency. The measuring signal now measures the frequency characteristic of an echo signal (a) outputted from the A/D converter 5 after flowing to the side of the receiving line. Then, in accordance with a frequency characteristic data (b) corresponding to said echo signal which is outputted from the frequency characteristic measuring apparatus 9, the digital filter 8 is arranged to set up its frequency characteristic of the filter. The frequency characteristic of the filter set up here is not necessary to be changed unless the connected two-wire communication line is changed. After the setting of the filter frequency characteristic of the digital filter 8 has been completed, the data selector 10 as a switch is switched so that the transmission signal can be inputted to the D/A converter 6.

Now, the receiving signal from the two-wire communication line is inputted from the hybrid circuit 1 and passes the receiving amplifier 3, the A/D converter 5 and the signal adding machine 7 to become a four-wire receiving signal.

On the other hand, the four-wire transmission signal passes the D/A converter 6 and the transmission amplifier 4 and then sent out from the hybrid circuit 1 to the two-wire communication line. At the same time, all of the transmission signal reaching the hybrid circuit 1 from the transmission amplifier 4 is not always outputted to the two-wire communication line, but a part thereof flows from the hybrid circuit 1 to the receiving amplifier 3 and passes the A/D converter 5 to appear as an echo signal on the side of four-wire receiving output, after following the same route as the receiving signal from said two-wire communication line. The volume of this echo signal is in proportion to the discrepancy in the impedance balance between the two-wire communication line and the balancing network 2.

Then, the former four-wire transmission signal is processed to form an inverted signal (-a) at a size corresponding to the volume of said echo signal by means of the digital filter 8 and in accordance with the frequency characteristic data. When the inverted signal (-a) is added to the echo signal from the A/D converter 5 by the signal adding machine 7, an output from the adding machine 7 becomes a four-wire receiving signal leaving the original two-wire receiving signal by cancelling only the echo signal.

Further, as described above, the filter frequency characteristic of the digital filter 8 used here is adapted to match the two-wire communication line which is connected by the frequency characteristic measurement of the echo signal and therefore the echo does not remain.

Still further, in such a preferred embodiment, although it has been explained to measure the frequency characteristic of the echo signal, the present invention is not limited thereto and a phase characteristic or a level characteristic may be measured.

Furthermore, in the above embodiment, although the signal for measuring the frequency characteristic has been described to output from the frequency characteristic measuring apparatus 9, the signal may be inputted from the inputting portion for the transmission signal.

As described above, according to the present invention, as the two-wire communication line to be connected is different in the line length, the line diameter or the combination thereof, as an actual communication line, the impedance of the communication line is also different from each other. So, even if the echo condition is also different for each line, it is advantageous in that the signal characteristic of the filter can be set up to match the line to be connected and it can further flexibly cope with the communication environment.

What is claimed is:

1. A two-wire to four-wire switching exchanger arranged such that a two-wire communication line is branched into a four-wire receiving line and a four-wire transmission line through a hybrid circuit controlled by a balanced network so that a receiving signal is received through the two-wire line, the hybrid circuit, and the four-wire receiving line, and in which a transmission signal is transmitted through the four-wire transmission line, the hybrid circuit, and the two-wire line, and a part of the transmission signal is transmitted through the hybrid circuit to the four-wire receiving line as an echo signal, said switching exchanger comprising:

an adder provided for the four-wire receiving line;

a digital filter for receiving the transmission signal, for generating an echo cancellation signal based on the transmission signal and for applying the echo cancellation signal to the adder to cancel the echo signal component from the receiving signal received on the four-wire receiving line; and a signal characteristic measuring apparatus for outputting a test signal and applying said test signal to the four-wire transmission line prior to communication to measure the characteristic of the echo signal applied to the four-wire receiving line by means of the test signal, and for setting the filter characteristics of the digital filter before communication according to the measured characteristic of the echo signal produced by the test signal;

whereby the filter characteristics of the digital filter are set before communication in accordance with said measured characteristic of the echo signal.

2. The two-wire to four-wire switching exchanger according to claim 1, further comprising:

a selector for selecting the test signal from the signal characteristic measuring apparatus before communication and the transmission signal at the time of communication and for transmitting the selected signal to the four-wire transmission line.

3. The two-wire to four-wire switching exchanger according to claim 1 or claim 2, wherein the signal characteristic measuring apparatus includes means for changing the frequency of the test signal within a range of the communication frequency band and for outputting the frequency changed signal as a test signal for measuring the frequency characteristic of the echo signal.

4. The two-wire to four-wire switching exchanger according to claim 1 or claim 2, wherein the signal characteristic measuring apparatus includes means for outputting the test signal for measuring the phase characteristic of the echo signal.

5. The two-wire to four-wire switching exchanger according to claim 1 or claim 2, wherein the signal characteristic measuring apparatus includes means for outputting the test signal for measuring the level characteristic of the echo signal.

* * * * *